United States Patent
Lei et al.

(10) Patent No.: US 10,491,731 B2
(45) Date of Patent: Nov. 26, 2019

(54) METHOD AND MOBILE TERMINAL FOR INITIATING COMMUNICATION UTILIZING A PLURALITY OF ASSIGNED PHONE NUMBERS

(71) Applicant: Xiaomi Inc., Beijing (CN)

(72) Inventors: Jun Lei, Beijing (CN); Xinyu Liu, Beijing (CN); Wenlin Wang, Beijing (CN); Xingping Zheng, Beijing (CN); Kun Niu, Beijing (CN); Yuxiang Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 248 days.

(21) Appl. No.: 14/271,627

(22) Filed: May 7, 2014

(65) Prior Publication Data

US 2015/0057043 A1   Feb. 26, 2015

Related U.S. Application Data

(63) Continuation of application No. PCT/CN2014/072220, filed on Feb. 19, 2014.

(30) Foreign Application Priority Data

Aug. 22, 2013 (CN) .......................... 2013 1 0369948

(51) Int. Cl.
   *H04W 8/18* (2009.01)
   *H04M 1/2745* (2006.01)

(52) U.S. Cl.
   CPC ............................. *H04M 1/274583* (2013.01)

(58) Field of Classification Search
   None
   See application file for complete search history.

(56) References Cited

U.S. PATENT DOCUMENTS 6,018,571 A  *  1/2000  Langlois et al. ......... 379/201.04
7,715,790 B1 *  5/2010  Kennedy ................... 455/552.1
(Continued)

FOREIGN PATENT DOCUMENTS

CN     2446725 Y       9/2001
CN     102857903       1/2013
(Continued)

OTHER PUBLICATIONS

International Search Report of PCT/CN2014/072220, mailed from the State Intellectual Property Office of China dated May 20, 2014.

*Primary Examiner* — Suhail Khan
(74) *Attorney, Agent, or Firm* — Finnegan, Henderson, Farabow, Garrett & Dunner LLP (57) ABSTRACT

A method for a mobile terminal to initiate a communication, the mobile terminal being assigned a plurality of phone numbers, the method including: receiving a communication instruction to initiate a communication with a target phone number; determining whether there are any communication records associated with the target phone number by searching a communication history; if it is determined that there are one or more communication records associated with the target phone number, determining a phone number for use in the communication from the plurality of phone numbers of the mobile terminal based on the one or more communication records associated with the target phone number; and if it is determined that there is no communication record associated with the target phone number, determining the phone number for use in the communication from the plurality of phone numbers of the mobile terminal based on a most recent communication record.

19 Claims, 8 Drawing Sheets

(56) References Cited

U.S. PATENT DOCUMENTS

| | | | | |
|---|---|---|---|---|
| 2005/0020286 | A1* | 1/2005 | Lazaridis | H04M 1/27455 455/466 |
| 2007/0253251 | A1* | 11/2007 | Mizushima | G06K 19/07 365/185.04 |
| 2009/0313583 | A1 | 12/2009 | Shih | |
| 2011/0289064 | A1* | 11/2011 | Lebeau | H04M 3/4931 707/706 |
| 2012/0135715 | A1* | 5/2012 | Kang et al. | 455/418 |
| 2013/0137484 | A1* | 5/2013 | Torres | H04W 4/24 455/558 |
| 2015/0018040 | A1* | 1/2015 | He et al. | 455/558 |

FOREIGN PATENT DOCUMENTS

| | | |
|---|---|---|
| CN | 102946464 A | 2/2013 |
| CN | 102984338 | 3/2013 |
| CN | 202841291 | 3/2013 |
| CN | 103068077 | 4/2013 |
| CN | 103561400 | 2/2014 |

* cited by examiner

METHOD AND MOBILE TERMINAL FOR INITIATING COMMUNICATION UTILIZING A PLURALITY OF ASSIGNED PHONE NUMBERS

CROSS-REFERENCE TO RELATED APPLICATIONS

This application is a continuation of International Application No. PCT/CN2014/072220, filed Feb. 19, 2014, which claims priority from Chinese Patent Application No. 201310369948.X, filed Aug. 22, 2013, the entire contents of all of which are incorporated herein by reference.

TECHNICAL FIELD

The present disclosure generally relates to the field of communication technology and, more particularly, to a method and a mobile terminal for initiating a communication.

BACKGROUND

The dual-card dual-standby technology allows a mobile phone to be provided with two user identity cards, such as subscriber identity module (SIM) cards or user identity module (UIM) cards, and use either of the two user identity cards to perform a communication. Each of the two user identity cards corresponds to a phone number, which may serve as a calling and called number. Conventionally, when a user wants to use the mobile phone with the two user identity cards to perform a communication, such as making a phone call or text messaging, the user generally needs to select one of the user identity cards by a manual operation to initiate the communication.

SUMMARY

According to a first aspect of the present disclosure, there is provided a method for a mobile terminal to initiate a communication, the mobile terminal being assigned a plurality of phone numbers, the method comprising: receiving a communication instruction to initiate a communication with a target phone number; determining whether there are any communication records associated with the target phone number by searching a communication history; if it is determined that there are one or more communication records associated with the target phone number, determining a phone number for use in the communication from the plurality of phone numbers of the mobile terminal based on the one or more communication records associated with the target phone number; if it is determined that there is no communication record associated with the target phone number, determining the phone number for use in the communication from the plurality of phone numbers of the mobile terminal based on a most recent communication record; and initiating the communication with the determined phone number.

According to a second aspect of the present disclosure, there is provided a mobile terminal assigned a plurality of phone numbers, comprising: a processor; a display; and a memory for storing instructions executable by the processor; wherein the processor is configured to: receive a communication instruction to initiate a communication with a target phone number; determine whether there are any communication records associated with the target phone number by searching a communication history; if it is determined that there are one or more communication records associated with the target phone number, determine a phone number for use in the communication from the plurality of phone numbers of the mobile terminal based on the one or more communication records associated with the target phone number; if it is determined that there is no communication record associated with the target phone number, determine the phone number for use in the communication from the plurality of phone numbers of the mobile terminal based on a most recent communication record; and initiate the communication with the determined phone number.

According to a third aspect of the present disclosure, there is provided a non-transitory computer-readable medium having stored therein instructions that, when executed by a processor of a mobile terminal assigned a plurality of phone numbers, cause the mobile terminal to perform a method to initiate a communication, the method comprising: receiving a communication instruction to initiate a communication with a target phone number; determining whether there are any communication records associated with the target phone number by searching a communication history; if it is determined that there are one or more communication records associated with the target phone number, determining a phone number for use in the communication from the plurality of phone numbers of the mobile terminal based on the one or more communication records associated with the target phone number; if it is determined that there is no communication record associated with the target phone number, determining the phone number for use in the communication from the plurality of phone numbers of the mobile terminal based on a most recent communication record; and initiating the communication with the determined phone number.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
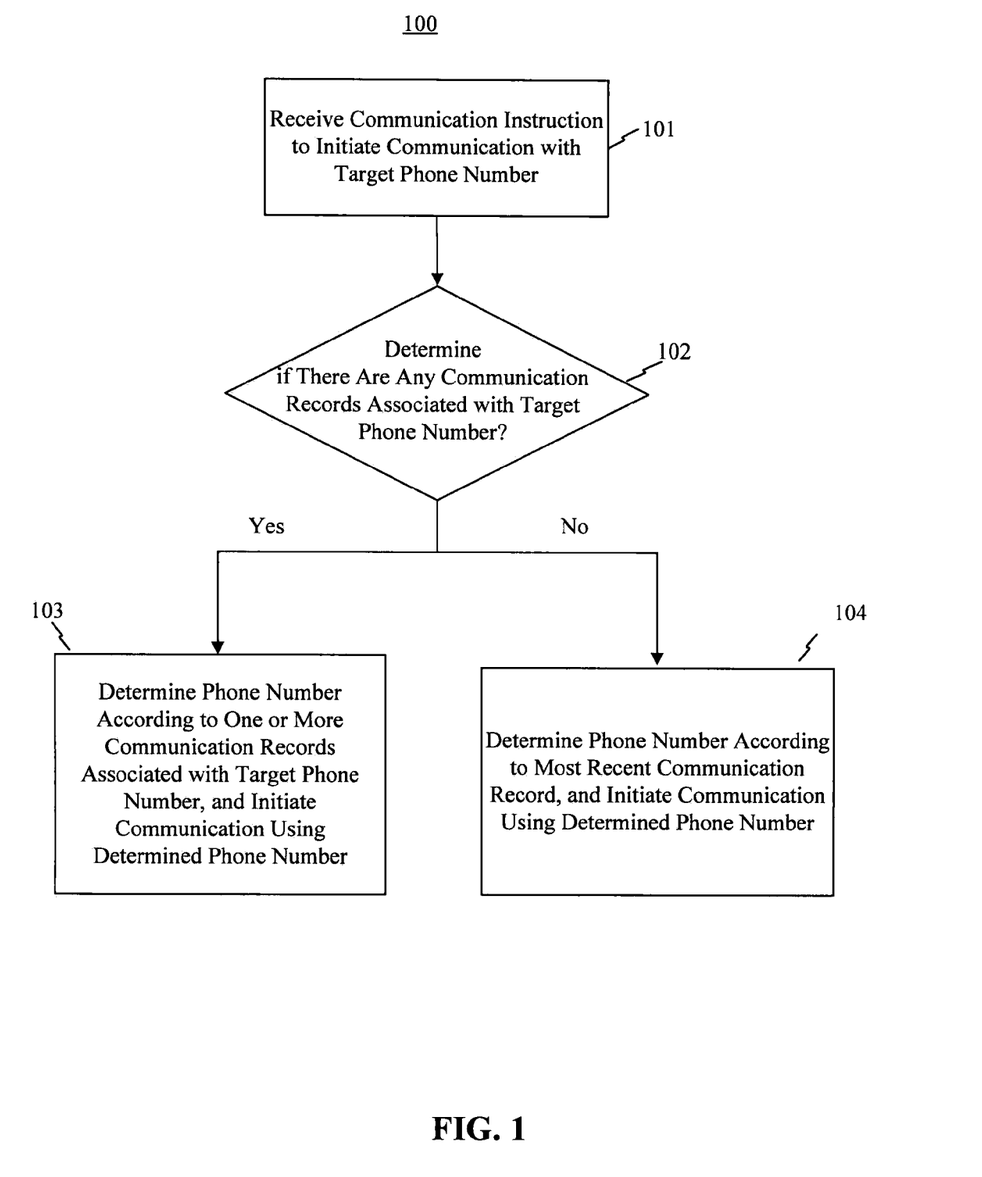
FIG. 1 shows a flowchart of a method for a mobile terminal to initiate a communication, according to an exemplary embodiment.

FIG. 1 shows a flowchart of a method 100 for a mobile terminal to initiate a communication, according to an exemplary embodiment. For example, the mobile terminal is assigned a plurality of phone numbers by operating with a plurality of user identity cards, such as subscriber identity module (SIM) cards or user identity module (UIM) cards. Also for example, the communication may be making a phone call or text messaging. Referring to FIG. 1, the method comprises the following steps.

In step 101, the mobile terminal receives a communication instruction to initiate a communication with a target phone number.

In step 102, the mobile terminal determines if there are any communication records associated with the target phone number by searching a communication history.

In step 103, if it is determined that there are one or more communication records associated with the target phone number, the mobile terminal determines a phone number for use in the communication from the plurality of phone numbers of the mobile terminal, according to the one or more communication records associated with the target phone number, and initiates the communication using the determined phone number.

In step 104, if it is determined that there is no communication record associated with the target phone number, the mobile terminal determines a phone number for use in the communication from the plurality of phone numbers of the mobile terminal, according to a most recent communication record, and initiates the communication using the determined phone number.

By using the method 100, if a user fails to select a phone number of the mobile terminal when initiating a communication, the mobile terminal can automatically select a phone number for the communication according to communication records, and initiate the communication without a further manual operation by the user. Thus, user operation time is saved, and communication performance is improved.

In exemplary embodiments, to perform step 103, the mobile terminal displays the plurality of phone numbers of the mobile terminal, and starts a countdown for a first phone number of the plurality of phone numbers, the first phone number being used by the mobile terminal in a most recent one of the communication records associated with the target phone number. If the mobile phone further detects an operation selecting one of the displayed phone numbers of the mobile terminal during the countdown, the mobile terminal determines the selected phone number as the phone number for use in the communication, and further initiates the communication. If the mobile terminal fails to detect an operation selecting one of the displayed phone numbers of the mobile terminal during the countdown, the mobile terminal initiates the communication using the first phone number.

In one exemplary embodiment, the mobile terminal displays a plurality of display zones in a designated zone on a display of the mobile terminal, each display zone corresponding to one of the plurality of phone numbers of the mobile terminal. Accordingly, the selecting operation may be a click operation on one of the display zones displaying the phone numbers, or a slide operation on one of the display zones. The mobile terminal also displays a timer for the countdown in the display zone corresponding to the first phone number.

In exemplary embodiments, the most recent one of the communication records associated with the target phone number may be a most recent communication record in which the target phone number is a called number, or a most recent communication record in which the target phone number is a calling number.

In exemplary embodiments, to perform step 104, the mobile terminal displays the plurality of phone numbers of the mobile terminal, and starts a countdown for a second phone number of the plurality of phone numbers, the second phone number being used by the mobile terminal in a most recent communication record. If the mobile terminal further detects an operation selecting one of the displayed phone numbers of the mobile terminal during the countdown, the mobile terminal determines the selected phone number as the phone number for use in the communication, and further initiates the communication. If the mobile terminal fails to detect an operation selecting one of the displayed phone numbers of the mobile terminal during the countdown, the mobile terminal initiates the communication using the second phone number.

In one exemplary embodiment, the mobile terminal displays a plurality of display zones in a designated zone on a display of the mobile terminal, each display zone corresponding to one of the plurality of phone numbers of the mobile terminal. Accordingly, the selecting operation may be a click operation on one of the display zones displaying the phone numbers, or a slide operation on one of the display zones. The mobile terminal further displays a timer for the countdown in the display zone corresponding to the second phone number. In addition, the most recent communication record may be stored in a communication history or in a designated file of the mobile terminal.

In exemplary embodiments, the mobile terminal further updates the most recent communication record when the communication is finished.

Figure 2:
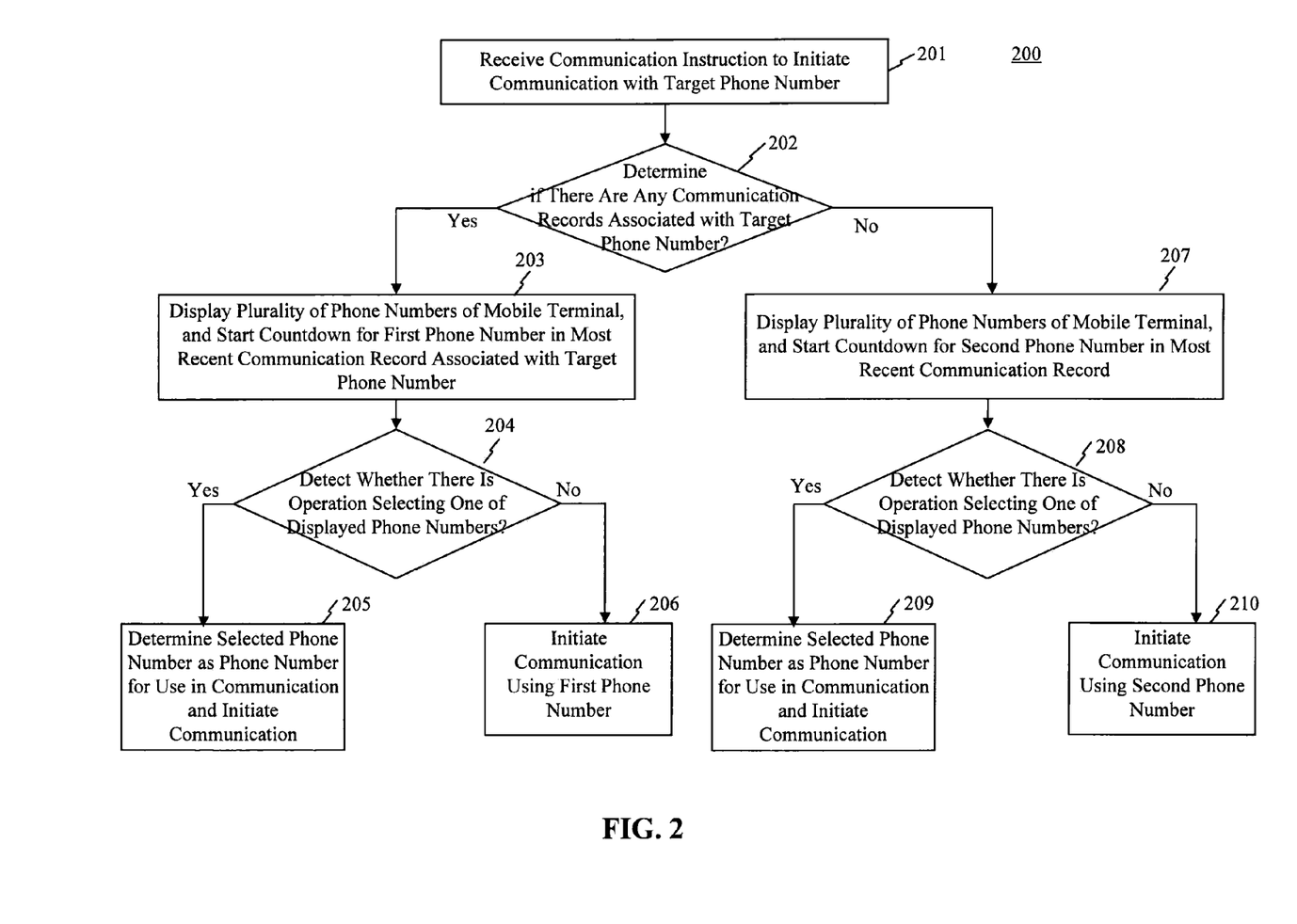
FIG. 2 shows a flowchart of a method for a mobile terminal to initiate a communication, according to an exemplary embodiment.

FIG. 2 shows a flowchart of a method 200 for a mobile terminal to initiate a communication, according to an exemplary embodiment. For example, the mobile terminal is assigned a plurality of phone numbers by operating with a plurality of user identity cards, such as two SIM cards, or two UIM cards, or one SIM card and one UIM card. Also for example, the communication may be making a phone call or text messaging. Referring to FIG. 2, the method 200 comprises the following steps.

In step 201, the mobile terminal receives a communication instruction to initiate a communication with a target phone number. For example, the user can input the target phone number by clicking number keys on a dial keyboard and clicking a calling key to trigger the communication instruction. Also for example, the communication instruction can be triggered by selecting a target contact in a contact list. After the mobile terminal receives the communication instruction, a phone number can be selected according to communication records for use in the communication.

In step 202, the mobile terminal determines if there are any communication records associated with the target phone number by searching a communication history. If it is determined that there are one or more communication records associated with the target phone number, the mobile terminal performs step 203; otherwise, the mobile terminal performs step 207.

In exemplary embodiments, the communication history includes phone numbers used by two parties, communication times, etc. For example, the communication history includes communication records relating to the phone numbers of the mobile terminal. Moreover, each communication record includes phone numbers used by two parties and a communication time.

In exemplary embodiments, the mobile terminal detects whether the target phone number is in the communication history. If so, the mobile terminal determines that there are one or more communication records associated with the target phone number. Otherwise, the mobile terminal determines that there is no communication record associated with the target phone number.

In one exemplary embodiment, the mobile terminal determines that the communication history is empty and, thus, the mobile terminal cannot determine a phone number for use in the present communication according to the communication history. Accordingly, the mobile terminal requests the user to select a phone number.

In step 203, if it is determined that there are one or more communication records associated with the target phone number, the mobile terminal displays the plurality of phone numbers of the mobile terminal, and starts countdown for a first phone number of the plurality of phone numbers, the first phone number being in a most recent one of the one or more communication records associated with the target phone number. For example, the most recent one of the communication records associated with the target phone number may be a most recent communication record in which the target phone number is a called number, or a most recent communication record in which the target phone number is a calling number. In some embodiments, the most recent one of the communication records associated with the target phone number is set by default to be a most recent communication record in which the target phone number is a calling number.

In one exemplary embodiment, when the user wants to make a phone call to a phone number A, the current communication history includes the following communication records: a first communication record regarding a first communication called from a first one of the phone numbers of the mobile terminal to the phone number A at 8:30 a.m. on Jan. 2, 2013; a second communication record regarding a second communication called from a second one of the phone numbers of the mobile terminal to another phone number B at 9:30 a.m. on Jan. 2, 2013; a third communication record regarding a third communication called from the phone number A to the first one of the phone numbers of the mobile terminal at 10:30 a.m. on Jan. 2, 2013; and a fourth communication record regarding a fourth communication called from the phone number B to the second one of the phone numbers of the mobile terminal at 12:30 p.m. on Jan. 2, 2013. Accordingly, the mobile terminal determines that the first and third communication records are the communication records associated with the target phone number A based on the communication history. The mobile terminal further determines that the third communication record is the most recent communication record associated with the target phone number A and, accordingly, determines the first phone number of the mobile terminal, as included in the third communication record, as the phone number for use in the current call to the number A.

In one exemplary embodiment, to perform step 203, the mobile phone displays a plurality of display zones in a designated zone on a display of the mobile terminal, each display zone corresponding to one of the plurality of phone numbers of the mobile terminal. The mobile terminal also displays a timer for the countdown in the display zone corresponding to the first phone number.

Figure 3:
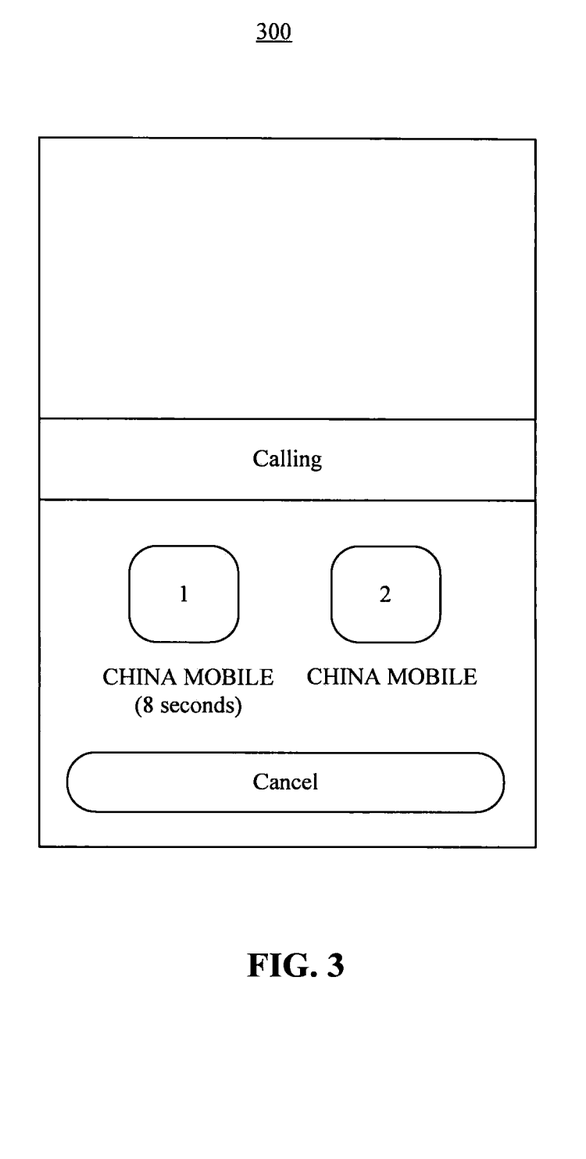
FIG. 3 shows a schematic diagram of a display interface on a mobile terminal initiating a communication, according to an exemplary embodiment.

FIG. 3 shows a schematic diagram of a display interface 300 on the mobile terminal, according to an exemplary embodiment. In the illustrated embodiment, it is assumed that the mobile terminal is assigned two phone numbers represented by 1 and 2, respectively. In addition, the mobile terminal determines the phone number 1 as the phone number for use in the communication. The display interface 300 displays those two phone numbers and a timer, showing "8 seconds" left, for the countdown for the phone number 1, which provides the user with an option to select a phone number directly for the communication during the countdown. A time length of the countdown may be preset and adjusted by the user.

Still referring to FIG. 2, in step 204, the mobile terminal detects whether there is an operation selecting one of the displayed phone numbers of the mobile terminal. If the mobile terminal detects the operation, the mobile terminal further performs step 205. Otherwise, the mobile terminal performs step 206. For example, the selecting operation may be a click operation on one of the display zones displaying the phone numbers, or a slide operation on one of the display zones displaying the phone numbers. By detecting whether there is an operation selecting one of the displayed phone numbers of the mobile terminal, the mobile terminal can determine whether a phone number is selected by the user for use in the communication.

In step 205, if the mobile terminal detects an operation selecting one of the displayed phone numbers of the mobile terminal during the countdown, the mobile terminal determines the selected phone number as the phone number for use in the communication and initiates the communication.

In step 206, if the mobile terminal fails to detect an operation selecting one of the displayed phone numbers of the mobile terminal during the countdown, the mobile terminal initiates the communication using the first phone number. For example, the mobile terminal's failure to detect an operation selecting one of the displayed phone numbers of the mobile terminal indicates that the user has not selected a phone number for use in the communication. Therefore, the mobile terminal can automatically select the first phone number for use in the communication.

Still referring to FIG. 2, in step 207, if it is determined that there is no communication record associated with the target phone number, the mobile terminal displays the plurality of the phone numbers of the mobile terminal and starts countdown for a second phone number, the second phone number being in a most recent communication record. For example, the most recent communication record may be stored in the communication history, or in a designated file of the mobile terminal. The designated file and the communication history may be saved under different storage paths in the mobile terminal.

In the embodiment illustrated above, if the user wants to call a phone number C, the mobile terminal will determine that there is no communication record associated with the phone number C in the current communication history. The mobile terminal thus determines that the fourth communication record is the most recent communication record, according to the communication time included therein. The mobile terminal further determines the phone number 2 of the mobile terminal included in the fourth communication record 4 to be the phone number for the current communication.

In one exemplary embodiment, the mobile terminal displays a plurality of display zones in a designated zone on the display of the mobile terminal, each display zone corresponding to one of the displayed phone numbers. In addition, the mobile terminal displays a timer for the countdown in the display zone corresponding to the second phone number.

In step 208, the mobile terminals detects whether there is an operation of selecting one of the displayed phone numbers of the mobile terminal, similar to step 204 described above. If so, the mobile terminal performs step 209; otherwise, the mobile terminals performs step 210. For example, the selecting operation may be a click operation on one of the display zones, or a slide operation on one of the display zones.

In step 209, if the mobile terminal detects an operation selecting one of the displayed phone numbers of the mobile terminal during the countdown, the mobile terminal determines the selected phone number to be the phone number for use in the communication, and further initiates the communication, similar to step 205 described above.

In step 210, if the mobile terminal fails to detect an operation selecting one of the displayed phone numbers of the mobile terminal, the mobile terminal initiates the communication with the second phone number. For example, the mobile terminal's failure to detect an operation selecting one of the displayed phone numbers of the mobile terminal indicates that the user has not selected one of the displayed phone numbers for the communication. Therefore, the mobile terminal can automatically select the second phone number for use in the communication.

In exemplary embodiments, the mobile terminal updates the most recent communication record when the communication is completed. In one exemplary embodiment, the most recent communication record is stored in a designated file in the mobile terminal. Accordingly, the mobile terminal updates the most recent communication record stored in the designated file with the communication record corresponding to the current communication. In one exemplary embodiment, the most recent communication record is obtained from the communication history. Accordingly, the mobile terminal updates the communication history.

By using the method 200, if the user fails to select one of the phone numbers of the mobile terminal for the communication, the mobile terminal can automatically select a phone number based on the communication history, to initiate the communication. The method 200 can avoid an incomplete call operation as a result of the user's failure to select one of the phone numbers of the mobile terminal. Thus, user operation time is saved and communication performance is improved.

Figure 4:
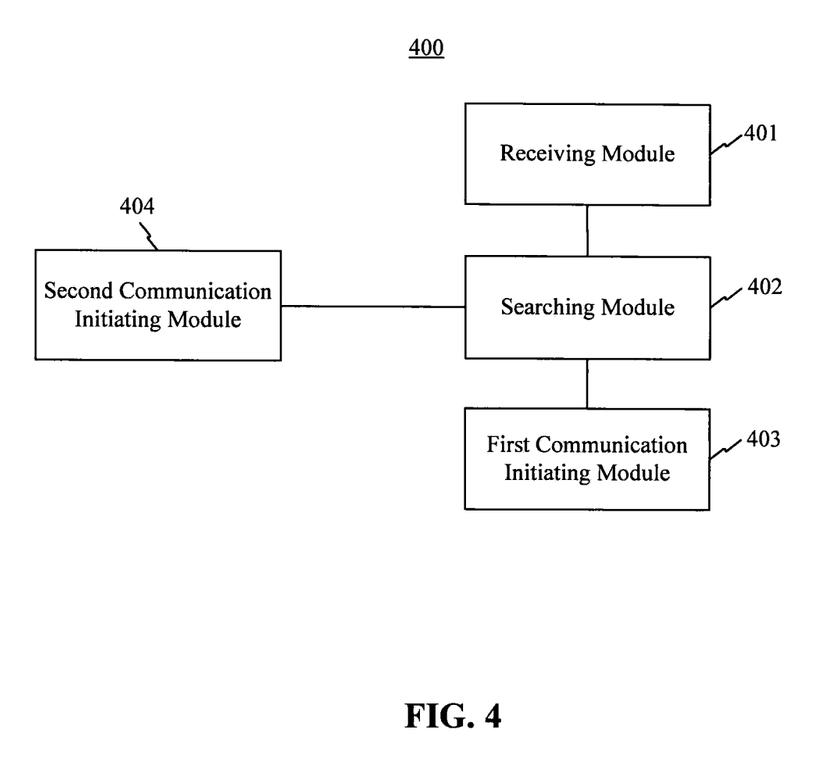
FIG. 4 shows a block diagram of a mobile terminal for initiating a communication, according to an exemplary embodiment.

FIG. 4 shows a block diagram of a mobile terminal 400 for initiating a communication, according to an exemplary embodiment. Referring to FIG. 4, the mobile terminal 400 comprises a receiving module 401, a searching module 402, a first communication initiating module 403, and a second communication initiating module 404. The receiving module 401 is configured to receive a communication instruction to initiate a communication with a target phone number. The searching module 402 is coupled to the receiving module 401 and configured to search a communication history to determine if there are any communication records associated with the target phone number. The first communication initiating module 403 is coupled to the searching module 402, and is configured, if it is determined that there are one or more communication records associated with the target phone number, to determine one of a plurality of phone numbers of the mobile terminal 400 for use in the communication according to the communication records associated with the target phone number, and further to initiate the communication. The second communication initiating module 404 is coupled to the searching module 402, and is configured, if it is determined that there is no communication record associated with the target phone number, to determine one of the plurality of phone numbers of the mobile terminal 400 for use in the communication based on a most recent communication record, and further to initiate the communication.

Figure 5:
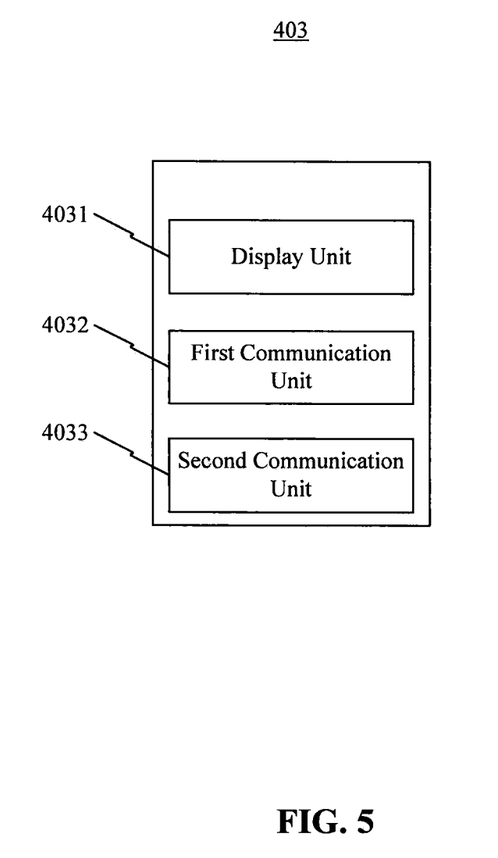
FIG. 5 shows a block diagram of a first communication initiating module of the mobile terminal shown in FIG. 4, according to an exemplary embodiment.

FIG. 5 shows a block diagram of the first communication initiating module 403 (FIG. 4), according to an exemplary embodiment. Referring to FIGS. 4 and 5, the first communication initiating module 403 includes a display unit 4031, a first communication unit 4032, and a second communication unit 4033. The display unit 4031 is configured to display the plurality of phone numbers of the mobile terminal 400 and to start a countdown for a first one of the phone numbers, the first phone number being in a most recent one of the communication records associated with the target phone number. The first communication unit 4032 is configured to determine one of the displayed phone numbers selected by the user as the phone number for use in the communication and further to initiate the communication, if the display unit 4031 detects an operation selecting the one of the displayed phone numbers of the mobile terminal during the countdown. The second communication unit 4033 is configured to initiate the communication using the first phone number, if the display unit 4031 fails to detect an operation selecting one of the displayed phone numbers of the mobile terminal during the countdown.

In addition, the display unit 4031 is configured to display a plurality of display zones in a designated zone on a display of the mobile terminal 400, each display zone corresponding to one of the phone numbers. The display unit 4031 is also configured to display a timer for the countdown for the first phone number in the corresponding display zone.

Figure 6:
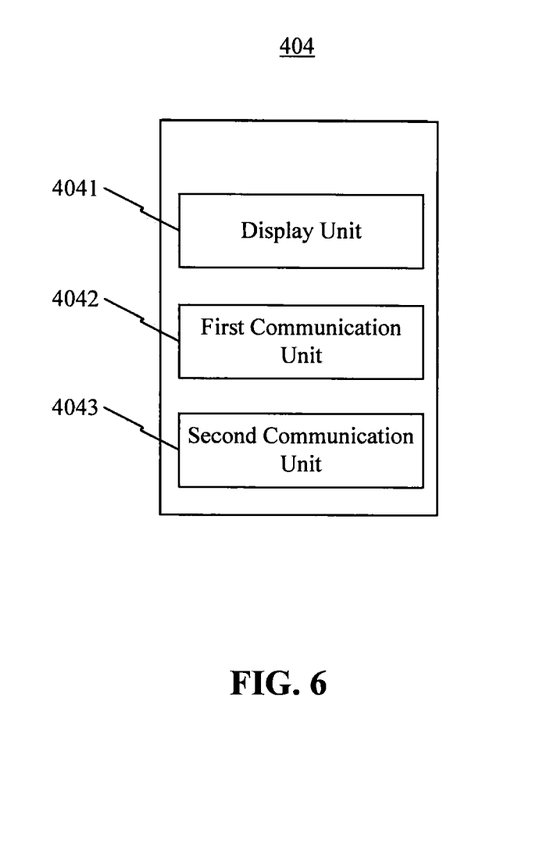
FIG. 6 shows a block diagram of a second communication initiating module of the mobile terminal shown in FIG. 4, according to an exemplary embodiment.

FIG. 6 shows a block diagram of the second communication initiating module 404 (FIG. 4), according to an exemplary embodiment. Referring to FIGS. 4 and 6, the second communication initiating module 404 includes a display unit 4041, a first communication unit 4042, and a second communication unit 4043. The display unit 4041 is configured to display the phone numbers of the mobile terminal 400, and to start countdown for a second one of the phone numbers of the mobile terminal, the second phone number being in a most recent communication record. The first communication unit 4042 is configured to determine one of the displayed phone numbers selected by the user as the phone number for use in the communication and to initiate the communication, if the display unit 4041 detects an operation selecting the one of the phone numbers of the mobile terminal. The second communication unit 4043 is configured to initiate the communication with the second phone number, if the display unit 4041 fails to detect an operation selecting one of the displayed phone numbers of the mobile terminal during the countdown.

In addition, the display unit 4041 is configured to display a plurality of display zones in a designated zone on the display of the mobile terminal 400, each display zone corresponding to one of the displayed phone numbers. The display unit 4041 is also configured to display a timer for the countdown for the second phone number in the corresponding display zone.

Figure 7:
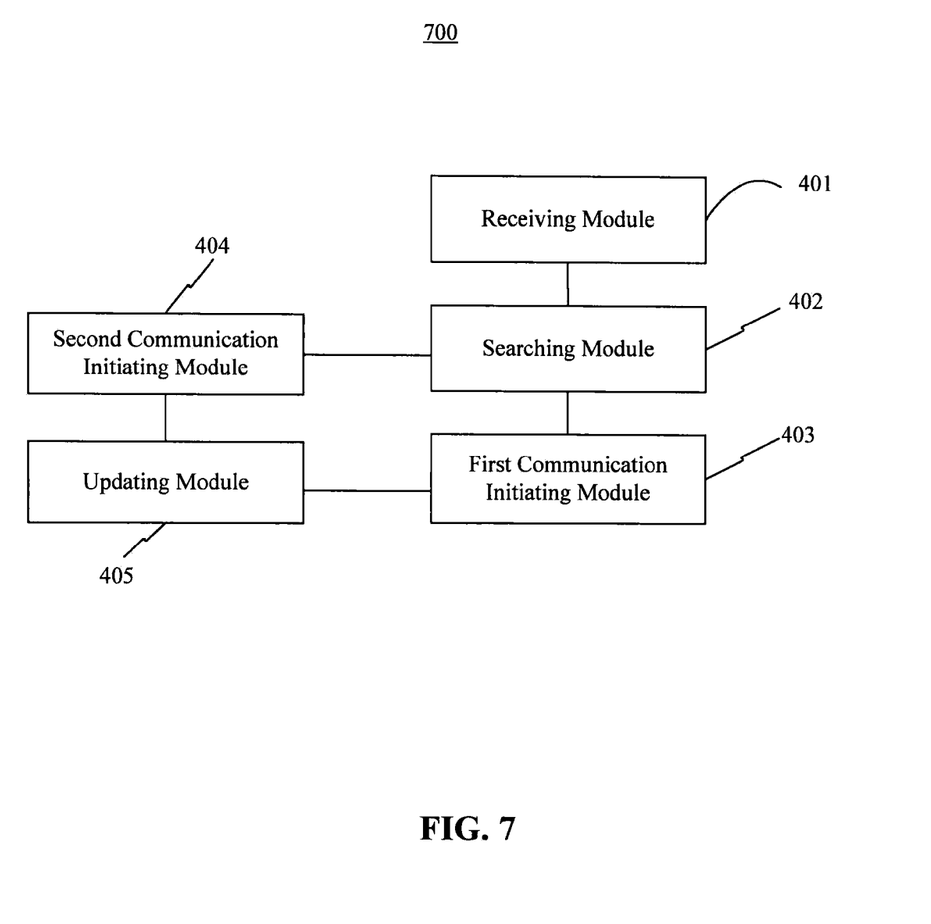
FIG. 7 shows a block diagram of a mobile terminal for initiating a communication, according to an exemplary embodiment.

FIG. 7 shows a block diagram of a mobile terminal 700 to initiate a communication, according to an exemplary embodiment. Referring to FIG. 7, the mobile terminal 700 further includes an updating module 405, in addition to the components in the mobile terminal 400 (FIG. 4). The updating module 405 is coupled to the first and second communication initiating modules 403 and 404, respectively. The updating module 405 is configured to update the most recent communication record when the communication is completed.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Figure 8:
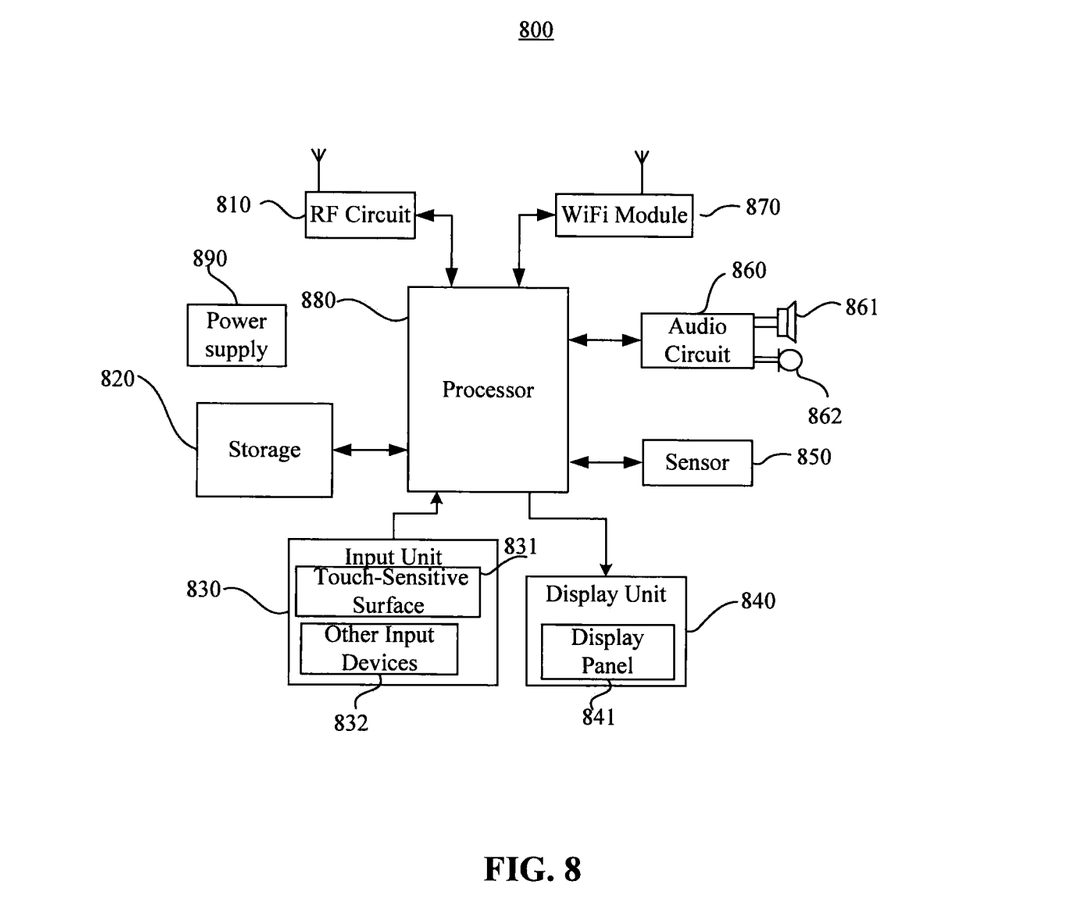
FIG. 8 shows a block diagram of a mobile terminal, according to an exemplary embodiment.

FIG. 8 shows a block diagram of a mobile terminal 800, according to an exemplary embodiment. For example, the mobile terminal 800 may be any of the mobile terminals described above in connection with FIGS. 1-7. Referring to FIG. 8, the mobile terminal 800 may include one or more of the following components: a radio frequency (RF) circuit 810; memory resources represented by a storage 820; an input unit 830; a display unit 840; a sensor 850; an audio circuit 860; a wireless fidelity (WiFi) module 870; a processor 880 including one or more processor cores; and a power supply 890. Those skilled in the art should understand that the mobile terminal 800 is not limited to the structure shown in FIG. 8. Rather, more or fewer components than those illustrated, or a combination of some components, or a different component configuration, may be included.

The RF circuit 810 receives and transmits signals when the mobile terminal 800 performs communication, such as making a phone call or sending/receiving messages. For example, after receiving downlink information from a base station, the information may be passed to the processor 880 to be processed. Moreover, the RF circuit 810 transmits related uplink data to the base station. The RF circuit 810 may include an antenna, at least one amplifier, a tuner, one or more oscillators, a transceiver, a coupler, a low noise amplifier (LNA), and a multiplexer. Furthermore, the RF circuit 810 may be connected with a network and other communication devices through wireless communication adopting any one of communication standards or protocols, including, e.g., Global System of Mobile Communication (GSM), General Packet Radio Service (GPRS), Code Division Multiple Access (CDMA), Wideband Code Division Multiple Access (WCDMA), Long Term Evaluation (LTE), and Short Message Service (SMS), etc.

The storage 820 is configured to store software programs and modules, e.g., instructions for implementing the methods 100 (FIG. 1) and 200 (FIG. 2) described above. The processor 880 performs various applications and data processes through running the software programs and modules stored in the storage 820. The storage 820 may be provided mainly with a program storage zone and a data storage zone. The program storage zone is configured to store an operation system and application programs, such as a sound player program, an image display program, etc., required by at least one function. The data storage zone is configured to store data, such as voice data, a contact book, etc., which is generated through an operation of the mobile terminal 800. Also, the storage 820 may include a high speed random access memory and a nonvolatile memory such as a magnetic disk, a flash memory, or other non-volatile solid-state memory. Correspondingly, there may be a storage controller arranged in the storage 820, controlling access to the storage 820 from the processor 880 and input unit 830.

The input unit 830 is configured to receive input information, such as number input or character input, and generate a signal input associated with client setting and system control, such as signal inputs of a keyboard, a mouse, an operation stick, an optical input device or a scroll ball. For instance, the input unit 830 includes a touch-sensitive surface 831 and other input devices 832. The touch-sensitive surface 831, also known as a touch display or a touch panel, is configured to collect the user's touch operation on or near the surface, such as user's operation on or near the touch-sensitive surface 831 by fingers, a touchpen, or other suitable objects or attachments, and drive related devices connected thereto in accordance with a preset program. Alternatively, there may be two primary parts provided in the touch-sensitive surface 831: a touch detecting device (not shown) and a touch controller (not shown). The touch detecting device detects touch directions from touch events and detects the corresponding touch signals to be transmitted to the touch controller. The touch controller receives the touch signals from the touch detecting device and converts them into coordinates of touch spots to be sent to the processor 880, and receives instructions issued from the processor 880 to perform an execution. In addition, the touch-sensitive surface 831 may be implemented as a resistive touch type, a capacitive touch type, an infrared touch type, or a surface acoustic touch type. In addition to the touch-sensitive surface 831, the input unit 830 can also include other input devices 832 such as one or more of a keyboard, a function key (voice control key, on-off key, etc.), a scroll ball, a mouse, and an operation stick.

The display unit 840 is configured to display information input by the user or provided to the user and a variety of graphic user interfaces, including graphs, texts, icons, videos and any combination thereof. The display unit 840 may include a display panel 841. Alternatively, the display panel 841 can be arranged utilizing a liquid crystal display (LCD) or an organic light-emitting diode (OLED). Moreover, the touch-sensitive surface 831 is arranged to cover the display panel 841. When the touch-sensitive surface 831 detects touch operations on or near itself, signals may be transmitted to the processor 880 to determine a type of touch events; after that, the processor 880 provides a corresponding visual output on the display panel 841 according to the type of the touch events. In the embodiment of FIG. 8, the touch-sensitive surface 831 and the display panel 841 are configured into two independent components to implement the functionalities of input and output, respectively. In another embodiment, the touch-sensitive surface 831 and the display panel 841 may be integrated to achieve the functionalities of input and output.

The sensor 850 may be an optical sensor, a motion sensor, and the like. The optical sensor, for example, may include an ambient light sensor and a proximity sensor. The ambient light sensor can adjust a luminance of the display panel 841 depending on an intensity of ambient light. The proximity sensor can achieve control of closing the display panel 841 and/or back light if the mobile terminal 800 is moved close to ear. As a kind of motion sensor, a gravity acceleration sensor may be provided to detect a magnitude of acceleration in different directions, e.g., along three axes, i.e., x axis, y axis, and z axis. When the mobile terminal 800 is static, the gravity acceleration sensor may detect the magnitude and direction of the gravity to be used for an application of recognizing an attitude of the mobile terminal 800, such as a horizontal and perpendicular direction switch of the panel, relative games, and declinometer direction adjustment, and functions related to vibration recognizing, such as a pedometer and knocking. The mobile terminal 800 may also be provided with a gyroscope, a barometer, a hygrometer, a thermometer, an infrared sensor and the like.

The audio circuit 860, together with a speaker 861 and a microphone 862, may provide a voice interface between the user and the mobile terminal 800. The audio circuit 860 transmits electrical signals converted from received audio information to the speaker 861. The speaker 861 converts the electrical signals into audible, e.g., voice, signals to output. On the other hand, the microphone 862 converts received audible, e.g., voice, signals into electrical signals and, after that, the audio circuit 860 converts the received electrical signals into audio information. The audio information may be output to and processed by the processor 880 and then, for example, sent to another mobile terminal through the RF circuit 810. Also, the audio information may be output to the storage 820 for further processing. The audio circuit 860 may further include an earphone interface used to provide a connection between an external earphone and the mobile terminal 800.

The WiFi module 870 is configured to provide broadband wireless communication with the Internet, for the mobile terminal 800 to implement applications, such as, e-mail service, web page and streaming medium browsing. Although the WiFi module 870 is shown in FIG. 8, it is not an indispensable component of the mobile terminal 800. In some embodiments, the mobile terminal 800 may be provided without the WiFi module 870 according to actual needs.

The processor 880 operates as a control center of the mobile terminal 800, connecting with each part arranged in the mobile terminal 800 through a variety of interfaces and buses. By operating and executing software programs and/or modules stored in the storage 820 and invoking data stored in the storage 820, the processor 880 implements a variety of applications and data processes to achieve an overall control of the mobile terminal 800. For example, by executing instructions stored in the storage 820, the processor performs the methods 100 (FIG. 1) or 200 (FIG. 2) described above. Additionally, the processor 880 may include one or more processor cores. For example, the processor 880 may be integrated with an application processor and a modulation-demodulation processor. The application processor is configured mainly to control the operation system, user interface, and application programs, whereas the modulation-demodulation processor is configured mainly to handle wireless communication. The modulation-demodulation processor may also be provided independently of the application processor.

The power supply 890 may be a battery providing power to components of the mobile terminal 800. For example, the power supply 890 is connected with the processor 880 through a power management system configured to implement a power charge-discharge management and a power consumption management. The power supply 890 may further include any components consisting of one or more direct current (DC)/alternate current (AC) power supplies, a recharge system, a power failure detection circuit, a power convertor or inverter, a power indicator and the like.

Although not shown in FIG. 8, the mobile terminal 800 may also include a camera, a Bluetooth module and the like.

In exemplary embodiments, there is provided a non-transitory storage medium including instructions, such as included in the storage 820, executable by the processor 880 in the mobile terminal 800, for performing the above described methods for initiating communication. For example, the instructions can be stored in a read-only memory, a disc, a CD-ROM, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a mobile terminal to initiate a communication, the mobile terminal being assigned a plurality of phone numbers, the method comprising:

receiving a communication instruction to initiate a communication with a target phone number;

in response to receiving the communication instruction to initiate the communication with the target phone number, determining whether there are any communication records associated with the target phone number by searching a communication history;

when it is determined that there are one or more communication records associated with the target phone number, determining a first phone number from the plurality of phone numbers of the mobile terminal based on the one or more communication records associated with the target phone number, the first phone number being used by the mobile terminal in a most recent one of the one or more communication records associated with the target phone number, wherein the most recent one of the one or more communication records is stored in a designated file of the mobile terminal, the designated file and the communication records being saved under different storage paths in the mobile terminal;

displaying the plurality of phone numbers of the mobile terminal and a first timer for a countdown for the first phone number, the first timer being displayed in a display zone corresponding to the first phone number; and starting the countdown for the first phone number, and if no operation of selecting one of the displayed phone numbers is detected during the countdown, determining the first phone number as the phone number of the mobile terminal for use in the communication with the target phone number;

when it is determined that there is no communication record associated with the target phone number, determining a second phone number from the plurality of phone numbers of the mobile terminal based on a most recent communication record;

displaying the plurality of phone numbers of the mobile terminal and a second timer for a countdown for the second phone number, the second timer being displayed in a display zone corresponding to the second phone number; and starting the countdown for the second phone number, and if no operation of selecting one of the displayed phone numbers is detected during the countdown, determining the second phone number as the phone number of the mobile terminal for use in the communication with the target phone number; and initiating the communication with the determined phone number for use in the communication with the target phone number.

2. The method of claim 1, wherein when it is determined that there are one or more communication records associated with the target phone number, the method further comprises:

if the operation of selecting one of the displayed phone numbers is detected during the countdown, determining the selected phone number as the phone number for use in the communication.

3. The method of claim 1, wherein when it is determined that there is no communication record associated with the target phone number, the method further comprises:

if the operation of selecting one of the displayed phone numbers is detected during the countdown, determining the selected phone number as the phone number for use in the communication.

4. The method of claim 2, wherein the displaying further comprises:

displaying a plurality of display zones in a designated zone on a display of the mobile terminal, each display zone corresponding to one of the plurality of phone numbers.

5. The method of claim 4, wherein the detecting of the operation of selecting comprises:

detecting at least one of a click operation or a slide operation on one of the display zones respectively corresponding to the plurality of phone numbers.

6. The method of claim 3, wherein the displaying further comprises:

displaying a plurality of display zones in a designated zone on a display of the mobile terminal, each display zone corresponding to one of the plurality of phone numbers.

7. The method of claim 6, wherein the detecting of the operation of selecting comprises:

detecting at least one of a click operation or a slide operation on one of the display zones respectively corresponding to the plurality of phone numbers.

8. The method of claim 2, wherein the most recent one of the communication records is one of a most recent one of the communication records associated with the target phone number in which the target phone number is the called number; or a most recent one of the communication records associated with the target phone number in which the target phone number is the calling number.

9. The method of claim 1, further comprising:

updating the most recent communication record when the communication is finished.

10. A mobile terminal assigned a plurality of phone numbers, comprising:

a processor;

a display; and a memory for storing instructions executable by the processor;

wherein the processor is configured to:

receive a communication instruction to initiate a communication with a target phone number;

in response to receiving the communication instruction to initiate the communication with the target phone number, determine whether there are any communication records associated with the target phone number by searching a communication history;

when it is determined that there are one or more communication records associated with the target phone number, determine a first phone number from the plurality of phone numbers of the mobile terminal based on the one or more communication records associated with the target phone number, the first phone number being used by the mobile terminal in a most recent one of the one or more communication records associated with the target phone number, wherein the most recent one of the one or more communication records is stored in a designated file of the mobile terminal, the designated file and the communication records being saved under different storage paths in the mobile terminal;

display the plurality of phone numbers of the mobile terminal and a first timer for a countdown for the first phone number, the first timer being displayed in a display zone corresponding to the first phone number; and start the countdown for the first phone number, and if no operation of selecting one of the displayed phone numbers is detected during the countdown, determine the first phone number as the phone number of the mobile terminal for use in the communication with the target phone number;

when it is determined that there is no communication record associated with the target phone number, determine a second phone number from the plurality of phone numbers of the mobile terminal based on a most recent communication record;

display the plurality of phone numbers of the mobile terminal and a second timer for a countdown for the second phone number, the second timer being displayed in a display zone corresponding to the second phone number; and start the countdown for the second phone number, and if no operation of selecting one of the displayed phone numbers is detected during the countdown, determine the second phone number as the phone number of the mobile terminal for use in the communication with the target phone number; and initiate the communication with the determined phone number for use in the communication with the target phone number.

11. The mobile terminal of claim 10, wherein when it is determined that there are one or more communication records associated with the target phone number, the processor is further configured to:

if the operation of selecting one of the displayed phone numbers is detected during the countdown, determine the selected phone number as the phone number for use in the communication.

12. The mobile terminal of claim 10, wherein when it is determined that there is no communication record associated with the target phone number, the processor is further configured to:
if the operation of selecting one of the displayed phone numbers is detected during the countdown, determine the selected phone number as the phone number for use in the communication.

13. The mobile terminal of claim 11, wherein the processor is further configured to:
display a plurality of display zones in a designated zone on the display, each display zone corresponding to one of the plurality of phone numbers.

14. The mobile terminal of claim 13, wherein the processor is further configured to:
detect at least one of a click operation or a slide operation on one of the display zones respectively corresponding to the plurality of phone numbers.

15. The mobile terminal of claim 12, wherein the processor is further configured to:
display a plurality of display zones in a designated zone on the display, each display zone corresponding to one of the plurality of phone numbers.

16. The mobile terminal of claim 10, wherein the processor is further configured to: update the most recent communication record when the communication is finished.

17. A non-transitory computer-readable medium having stored therein instructions that, when executed by a processor of a mobile terminal assigned a plurality of phone numbers, cause the mobile terminal to perform a method to initiate a communication, the method comprising:
receiving a communication instruction to initiate a communication with a target phone number;
in response to receiving the communication instruction to initiate the communication with the target phone number, determining whether there are any communication records associated with the target phone number by searching a communication history;
when it is determined that there are one or more communication records associated with the target phone number,
determining a first phone number from the plurality of phone numbers of the mobile terminal based on the one or more communication records associated with the target phone number, the first phone number being used by the mobile terminal in a most recent one of the one or more communication records associated with the target phone number, wherein the most recent one of the one or more communication records is stored in a designated file of the mobile terminal, the designated file and the communication records being saved under different storage paths in the mobile terminal;
displaying the plurality of phone numbers of the mobile terminal and a first timer for a countdown for the first phone number, the first timer being displayed in a display zone corresponding to the first phone number; and
starting the countdown for the first phone number, and if no operation of selecting one of the displayed phone numbers is detected during the countdown, determining the first phone number as the phone number of the mobile terminal for use in the communication with the target phone number;
when it is determined that there is no communication record associated with the target phone number,
determining a second phone number from the plurality of phone numbers of the mobile terminal based on a most recent communication record;
displaying the plurality of phone numbers of the mobile terminal and a second timer for a countdown for the second phone number, the second timer being displayed in a display zone corresponding to the second phone number; and
starting the countdown for the second phone number, and if no operation of selecting one of the displayed phone numbers is detected during the countdown, determining the second phone number as the phone number of the mobile terminal for use in the communication with the target phone number; and
initiating the communication with the determined phone number for use in the communication with the target phone number.

18. The non-transitory computer-readable medium of claim 17, wherein when it is determined that there are one or more communication records associated with the target phone number, the method further comprises:
if the operation of selecting one of the displayed phone numbers is detected during the countdown, determining the selected phone number as the phone number for use in the communication.

19. The non-transitory computer-readable medium of claim 17, wherein when it is determined that there is no communication record associated with the target phone number, the method further comprises:
if the operation of selecting one of the displayed phone numbers is detected during the countdown, determining the selected phone number as the phone number for use in the communication.

* * * * *